United States Patent
Garrett, Jr. et al.

(10) Patent No.: US 7,039,782 B2
(45) Date of Patent: May 2, 2006

(54) MEMORY SYSTEM WITH CHANNEL MULTIPLEXING OF MULTIPLE MEMORY DEVICES

(75) Inventors: Billy Wayne Garrett, Jr., Mountain View, CA (US); Frederick Abbott Ware, Los Altos Hills, CA (US); Craig E. Hampel, San Jose, CA (US); Richard M. Barth, Palo Alto, CA (US); Donald C. Stark, Los Altos, CA (US); Abhijit Mukund Abhyankar, Sunnyvale, CA (US); Catherine Yuhjung Chen, Milpitas, CA (US); Thomas J. Sheffler, San Francisco, CA (US); Ely K. Tsern, Los Altos, CA (US); Steven Cameron Woo, Saratoga, CA (US)

(73) Assignee: Rambus Inc., Los Altos, CA (US)

( * ) Notice: Subject to any disclaimer, the term of this patent is extended or adjusted under 35 U.S.C. 154(b) by 42 days.

(21) Appl. No.: 10/690,402

(22) Filed: Oct. 20, 2003

(65) Prior Publication Data

US 2004/0081005 A1    Apr. 29, 2004

Related U.S. Application Data

(62) Division of application No. 09/457,155, filed on Dec. 8, 1999, now Pat. No. 6,708,248.

(60) Provisional application No. 60/145,222, filed on Jul. 23, 1999.

(51) Int. Cl.
*G06F 12/00* (2006.01)

(52) U.S. Cl. .................. 711/167; 711/104; 711/150; 711/154

(58) Field of Classification Search ............... 711/167
See application file for complete search history.

(56) References Cited

U.S. PATENT DOCUMENTS

| | | | |
|---|---|---|---|
| 3,971,916 A | 7/1976 | Moreno | 711/164 |
| 4,266,271 A | 5/1981 | Chamoff et al. | 709/209 |
| 4,468,750 A | 8/1984 | Chamoff et al. | 709/251 |
| 4,566,102 A | 1/1986 | Hefner | 714/7 |
| 4,584,681 A | 4/1986 | Singh et al. | 714/7 |
| 5,243,703 A * | 9/1993 | Farmwald et al. | 713/400 |
| 5,283,872 A | 2/1994 | Ohnishi | 710/311 |
| 5,630,170 A | 5/1997 | Koizumi et al. | 710/12 |
| 5,657,468 A | 8/1997 | Stallmo et al. | 711/114 |
| 5,666,511 A | 9/1997 | Suganuma et al. | 711/114 |
| 5,872,999 A | 2/1999 | Koizumi et al. | 710/72 |
| 5,966,723 A | 10/1999 | James et al. | 711/103 |
| 6,049,856 A | 4/2000 | Bolyn | 711/168 |

(Continued)

OTHER PUBLICATIONS

*Direct RDRAM™ 64/72-Mbit Data Sheet*, Rambus, Inc., Jun. 2000.

(Continued)

*Primary Examiner*—Christian P. Chace
(74) *Attorney, Agent, or Firm*—Morgan, Lewis & Bockius LLP

(57) ABSTRACT

A high-speed memory system is disclosed in which a single command effects control over either a single memory device or a plurality of memory devices depending on a present mode of operation. Such control may effect data transfer between the one or more memory devices and a memory controller, as well as operating state transitions or power mode transitions for the memory devices. Similarly, various configurations of relatively low bandwidth memory devices respond as a selectively controllable group to transmit or receive high bandwidth data.

13 Claims, 17 Drawing Sheets

NON-CHIP-KILL DATA PACKET
CYCLE (TIME) MULTIPLEXING

U.S. PATENT DOCUMENTS

| | | | |
|---|---|---|---|
| 6,055,615 A | 4/2000 | Okajima | 711/169 |
| 6,065,092 A | 5/2000 | Roy | 711/5 |
| 6,449,670 B1 | 9/2002 | Jones et al. | 710/100 |

OTHER PUBLICATIONS

*Direct RAC Data Sheet*, Rambus, Inc., last modified Aug. 7, 1998.

*Direct RMC.dl Data Sheet*, Rambus, Inc., last modified Aug. 7, 1998.

*A Logical View of the Direct Rambus™ Architecture*, Rambus, Inc., Mar. 1998.

*Direct Rambus™ Technology Overview*, Rambus, Inc., Oct. 1997.

*Direct Rambus® Clock Generator*, Rambus, Inc., Jun. 1999.

*Rambus® RIMM™ Module Data Sheet*, Rambus, Inc., Mar. 1999.

*Direct Rambus™ Memory Controller*, Rambus, Inc., Jul. 2000.

\* cited by examiner

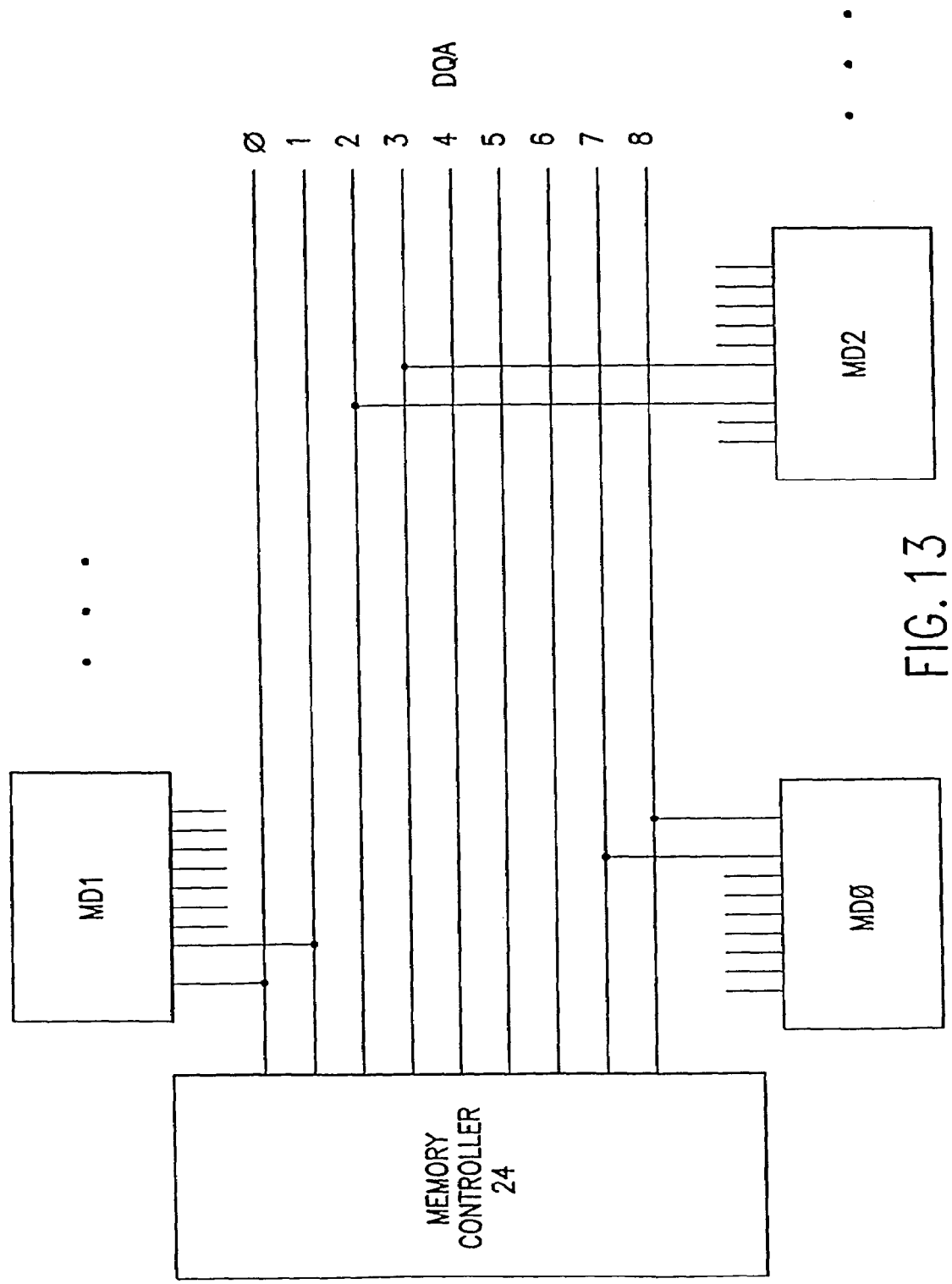

| CYCLE | ROW[2] | ROW[1] | ROW[0] |
|---|---|---|---|
| 0 | BIT 1<br>BIT 4 | BIT 2<br>BIT 5 | BIT 3 |
| 1 | | | |
| 2 | | | AV |
| 3 | | | |

ROW PACKET STRUCTURE

FIG. 14A

| CYCLE | COL [4] | COL [3] | COL [2] | COL [1] | COL [0] |
|---|---|---|---|---|---|
| 0 | BIT 1 | BIT 2 | BIT 3 | BIT 4 | BIT 5 |
| 1 | | | COPBIT 1 | COPBIT 2 | |
| 2 | | | | | |
| 3 | | | | | |

COLUMN PACKET STRUCTURE

FIG. 14B

NON-CHIP-KILL DATA PACKET
CYCLE (TIME) MULTIPLEXING

MEMORY SYSTEM WITH CHANNEL MULTIPLEXING OF MULTIPLE MEMORY DEVICES

This application is a division of U.S. patent application Ser. No. 09/457,155, filed Dec. 8, 1999, which has issued as U.S. Pat. No. 6,708,248 on Mar. 16, 2004, and claims priority on U.S. Provisional Application No. 60/145,222, filed Jul. 23, 1999, both of which are hereby incorporated by reference.

FIELD OF THE INVENTION

A memory system is disclosed which is characterized by high speed data throughput on a channel, or on a number of channels, between a memory controller and associated memory devices.

BACKGROUND OF THE INVENTION

During the last several decades, memory technology has progressed dramatically. The density of commercial memory devices, taking Dynamic Random Access Memory (DRAM) as a convenient example, has increased from 1 Kbit to 64 Mbits per chip, a factor of 64,000. Unfortunately, memory device performance has not kept pace with increasing memory device densities. In fact memory device access times during the same time period has only improved by about a factor of 5. By comparison, during the past twenty years, microprocessor performance has increased by several orders of magnitude. This growing disparity between the speed of microprocessors and that of memory devices has forced memory system designers to create a variety of complicated and expensive hierarchical memory techniques, such as Static Random Access Memory (SRAM) caches and parallel DRAM arrays. Further, now that computer system users increasingly demand high performance graphics and other memory hungry applications, memory systems often rely on expensive frame buffers to provide the necessary data bandwidth. Increasing memory device densities satisfy the overall quantitative demand for data with fewer chips, but the problem of effectively accessing data at peak microprocessor speeds remains.

Massively parallel DRAM arrays having relatively wide buses have been a typical response to the demand for more data bandwidth at higher access speeds. FIGS. 1 and 2 illustrate generic, conventional memory systems having a memory controller 10 connected to a number of memory devices 12 via a wide bus structure. In FIG. 1, each memory device 12 is connected to memory controller 10 via sixteen (16) dedicated bus lines. (Not all bus lines are individually shown for the sake of clarity). Assuming four memory devices in the system of FIG. 1, the data bus is 64 lines wide. This structure allows the memory controller to directly send and receive data from a specific memory device without interference from any other memory device. However, each data bit so sent and received requires the addition of another data line to the bus.

In the memory system shown in FIG. 2, a single 64-bit line, data bus is shared by four 64-bit memory devices. In the example shown in FIG. 1, accessing four 64-bit memory devices would require a 256 line wide data bus. Thus, the structure of the memory system shown in FIG. 2 represents an advance over that of FIG. 1. However, the reduction in relative data bus width comes with some additional overhead. In the memory system of FIG. 2, each memory device receives an individual set of control signals 14 from memory controller 10. These separately transmitted signals are required to regulate memory device access to the common data bus lines.

As can be seen from the foregoing examples, conventional memory systems use a large number of data lines, or a relatively wide bus. The term "line(s)" is used to describe the physical means by which data bits are electronically communicated from one point to another in a system. A line may take the form, alone or in combination, of a printed circuit board (PCB) strip, metal contact, pin and/or via, microstrip, semiconductor channel, etc. A line may be single or may be associated with a bus. A "bus" is a collection, fixed or variable, of lines, and may also be used to describe the drivers, latches, buffers, and other elements associated with an operative collection of lines. In the description of the invention which follows, a bus may communicate control information, address information, and/or data. In the foregoing examples of conventional memory systems, the bus was assumed to transmit data only. Address and control information is separately transmitted by additional lines or buses.

Such massively parallel, or wide buses, are required in conventional memory systems due to the slow access speed of the individual memory devices. Wide buses have long been associated with implementation and performance problems, such as excessive power consumption, slow speed, loss of expandability and design flexibility, etc. As a result, bus multiplexing of control, address and/or data information has become commonplace. Multiplexing, in any of its varied forms, effectively "time-shares" a bus between a number of devices.

Multiplexing allows reduction in bus size. It also greatly increases system complexity. Such complexity often results in increased memory system rigidity. That is, once implemented in all its complexity, the integration of a new function into the bus-multiplexing memory system becomes extremely difficult. In particular, memory system designers continue to face enormous challenges in increasing data throughput while minimizing system complexity, and maintaining system reliability.

SUMMARY OF THE INVENTION

The present invention provides a high-speed memory system having enhanced modal functionality without a significant corresponding increase in system complexity.

Thus, in one aspect, the present invention provides a memory system operating in either a first mode or a second mode of operation. The memory system includes a memory controller that is connected to memory devices via at least one channel. The memory controller communicates at least one command to each one of memory devices via the at least one channel. While the memory system operates in the first mode, one of the memory devices responds to the at least one command to accomplish transfer of data between the one memory device and the memory controller during a first time period. And while the memory system operates in the second mode, a plurality of the memory devices responds to the at least one command to accomplish transfer of data between the plurality of memory devices and the memory controller during the first time period.

In another aspect, the present invention provides a memory system operating in either a first mode or a second mode of operation. The memory system includes a memory controller that is connected to memory devices via at least one channel. The memory controller communicates at least one command to each one of memory devices via the at least one channel. While the memory system operates in the first mode, one of the memory devices responds to the at least one command to change operating states. And while the memory system operates in the second mode, a plurality of the memory devices responds to the at least one command to change operating states.

Thus, in one aspect, the present invention provides a memory system including a memory controller connected to at least one channel, and memory devices connected to the at least one channel. At least one of the memory devices is a low bandwidth device being individually incapable of communicating a first data block with the memory controller during a first time period. The memory controller communicates control information to at least a first plurality of the memory devices via the at least one channel, and in response to the control information, the first plurality of memory devices, as a multiplexed group on the channel, communicates a first data block between the memory controller and the first plurality of the memory devices during a first time period.

The present invention in various configurations also allows a plurality of relatively low bandwidth memory devices to combine in operation to produce high bandwidth data output.

In still another aspect, the present invention provides a memory system including a memory controller connected to at least one repeater via a main channel. Each repeater connects a first plurality of memory devices via at least one auxiliary channel. Each one of the first plurality of memory devices is a low bandwidth device individually incapable of communicating a first data block with the memory controller during a first time period. The memory controller communicates control information to the first plurality of the memory devices via the at least the main channel, the at least one repeater, and the at least one auxiliary channel. In response to the control information, the first plurality of memory devices, as a multiplexed group on the channel, communicates a first data block between the memory controller and the first plurality of the memory devices during a first time period.

In a related aspect to the foregoing, the present invention provides a memory system capable of selectively operating in first and second modes. The memory system includes a memory controller, memory devices, and a channel connecting the memory controller with the memory devices. Each one of the memory devices is capable of operating in at least a first and a second power state. The first power state consumes more power than the second power state, such that while the memory system is operating in the first mode, the memory controller generates a first power down device identification (ID) unique to one of the memory devices. The one memory device upon receiving the first power down device ID will transition from the first power state to the second power state. And while the memory system is operating in the second mode, the memory controller generates a second power down device ID having the same structure as the first power down device ID, such that a plurality of memory devices upon receiving the second power down device ID transition from the first power state to a second power state.

In another related aspect, the present invention provides a memory system including a memory controller connected to a data bus. The data bus includes a plurality of lines. The memory controller generates one or more command packets. The memory system also includes a group of memory devices, where each memory device in the group is connected to at least one of the plurality of lines. And each one of the memory devices in the group includes a circuit responsive to the one or more command packets from the memory controller, such that the group of memory devices combine to output a first data packet during a first time period by multiplexing data onto the data bus during the first time period.

In still another related aspect, the present invention provides a method of reading data in a memory system during a first time period. The memory system includes a memory controller connected to memory devices via a data bus having multiple data bus lines. The method includes communicating at least one command packet from the memory controller to a plurality of the memory devices, for each memory device in the plurality of memory devices and seizing at least one data bus line during the first time period and returning data to the memory controller via the at least one data bus line in response to the at least one command packet.

In still another related aspect, the present invention provides a method of reading a first block of data in a memory system during a first time period. The memory system includes a memory controller connected to memory devices via a data bus having multiple data bus lines. The first time period includes a sequence of second time periods. The method includes communicating at least one command packet from the memory controller to a plurality of the memory devices, during each second time period, and outputting a second block of data smaller than the first block of data from a selected memory device in the plurality of memory devices via the data bus, such that a combination of the second blocks output during the first time period comprises the first data block.

BRIEF DESCRIPTION OF THE DRAWINGS

FIG. 13 illustrates an exemplary bit-line multiplex memory system according to the present invention.

FIGS. 14A and 14B illustrate exemplary ROW and COL packet command formats, respectively.

DETAILED DESCRIPTION

The assignee of the present invention has pioneered the development of next generation memory systems having a relatively narrow, high speed bus(es) and associated memory devices, along with the interface technology required to provide high data throughput. See, U.S. Pat. Nos. 5,319,755; 5,243,703; and 5,254,883, the disclosures of which are incorporated herein by reference.

Figure 1:
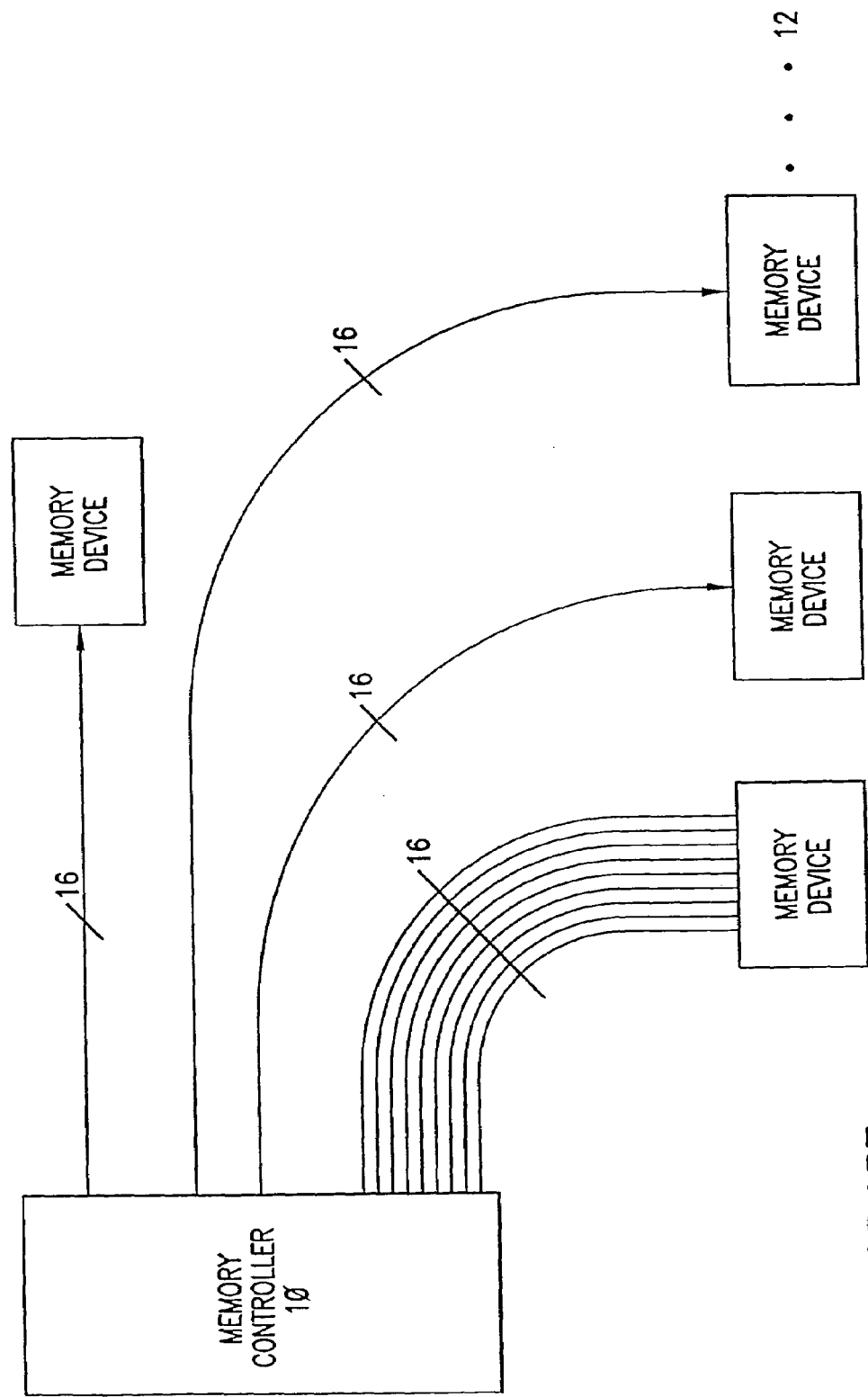
FIGS. 1 and 2 illustrate conventional wide bus memory systems.
Figure 2:
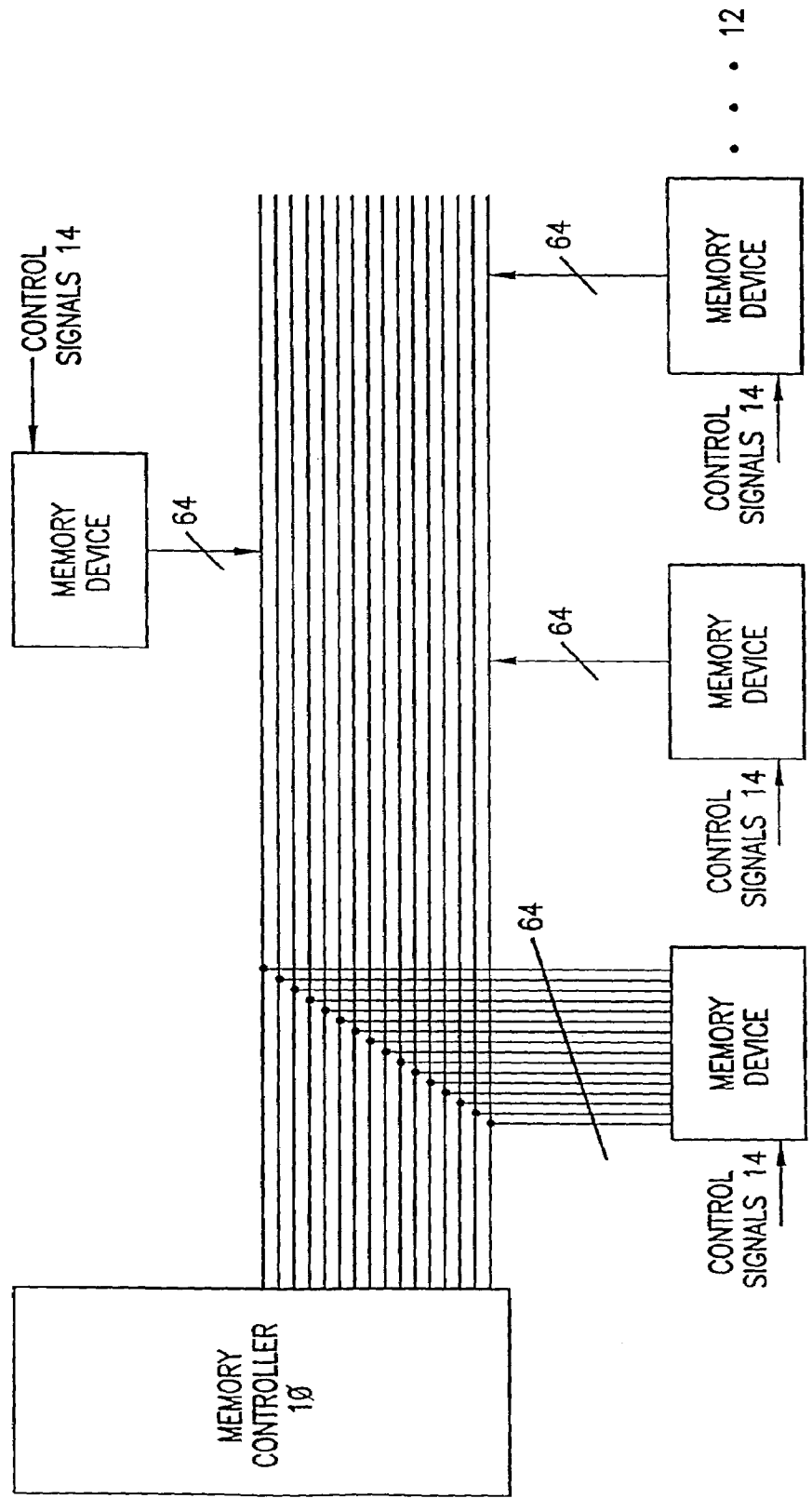
Figure 3:
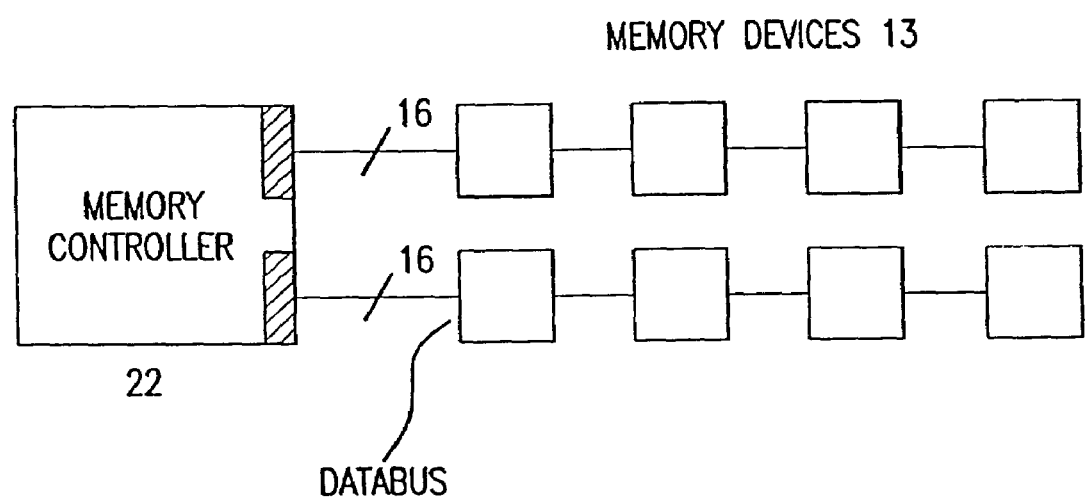
FIG. 3 generally illustrates one embodiment of a high-speed memory system having a relatively narrow bus.

Very general differences between conventional memory systems and the assignee's memory systems can be seen by comparing FIGS. 1 and 2 with FIG. 3. In FIG. 3, eight 16-bit memory devices 13 according to the assignees design are connected to a memory controller 22 by two 16 bit (1 byte) data buses. The 16 bit data buses may be viewed as a channel either individually or taken together. Presently, each one of the assignee's memory devices is capable, within the memory system architecture, of communicating control information, address information and/or data over each of two channels on both edges of a 400 MHz clock which results in an effective transfer rate of 800 MHz across each of two channels that are 2 bytes to produce a total data throughput of 3.2 GB/sec.

In effect, the assignee's solution replaces costly, conventional memory subsystems and interconnections with a single, standard chip-to-chip bus and improved memory devices. The term "memory device" as used in this document broadly describes a range of devices capable of storing data, and receiving and/or transmitting data at the request of controlling device(s). All forms and configurations of DRAMs, SRAMs, ROM, EPROM, and $E^2$PROM devices are contemplated by the term memory device. One defining feature of the term memory device is the presence of electronically accessible data stored in the row and column structure typical in the foregoing devices. Rows within this structure may often be further designated into banks and/or pages.

In addition to the referenced U.S. Patents, information describing the assignee's memory systems and memory devices may be had at Rambus™ Inc., Mountain View, Calif. See, for example, the Direct RDRAM™ 64/72-Mbit Data Sheet, the Direct RAC Data Sheet, the Direct RMC.d1 Data Sheet, A Logical View of the Direct Rambus Architecture, Direct Rambus Technology Overview, Direct Rambus Clock Generator Source Sheet, Direct Rambus RIMM™ Module Data Sheet, the Direct Rambus Memory Controller Summary, all 1998 documents and all incorporated herein by reference.

Figure 4:
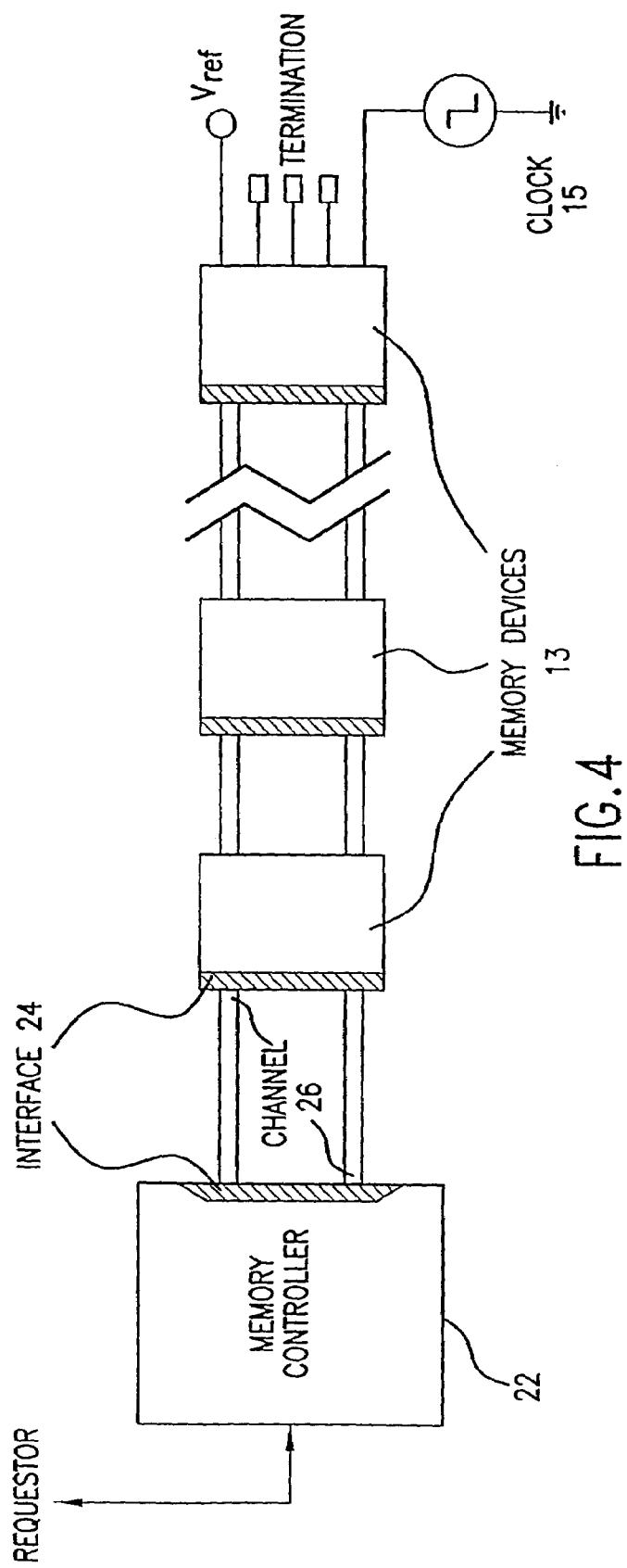
FIG. 4 illustrates a single channel embodiment of a high-speed memory system having a relatively narrow bus.

A memory system according to the present invention is generally illustrated in FIG. 4, wherein a memory controller 22 is connected to a plurality of memory devices 13 via a channel 26. Memory controller 22 and memory devices 13 typically include an interface 24 to channel 26. The memory devices are preferably 16 bit or 18 bit (2 byte) devices, but one of ordinary skill in the art will appreciate that the memory devices might be configured with any convenient number of bits and with any definition of byte size. Memory devices 13 only respond to memory controller 22, and accordingly require a relatively low level of intelligence. As a result, memory device die size overhead is minimized to keep the memory devices affordable.

Memory controller 22 is the only device generating commands to memory devices 13. Data transfers occur only between memory controller 22 and memory devices 13, never between memory devices.

Memory controller 22 interfaces with a "requester," external to the memory system. The requestor is any device requesting data be read/written from/to the memory system or performing memory device upkeep such as refresh, and may include, alone or in any combination, a conventional microprocessor, peripheral device, ASIC, conventional memory controller, or graphics chip. Memory controller 22 receives a command from the requester and translates the address, data, and control components of the command into a protocol common to memory controller 22 and memory devices 13.

Channel 26 connotes a system level specification defining a number of buses and signal lines, as well as their electrical and mechanical interfaces, including signaling levels and signal timing. A number of signal types may be present on channel 26 at any given time. In addition to a data bus, preferably 2 bytes wide, an address/control bus, and reference voltage lines, channel 26 may include various clock signals 15.

Preferably, bus lines in channel 26 are terminated at their characteristic impedance at one end. Thus, the bus topology of channel 26 finds memory controller 22 at one end and terminators at the other end, with memory devices in between.

Channel 26 is synchronous, meaning that all command and data transfers are referenced to clock edges. Preferably, a memory device sends data to memory controller 22 synchronous with one clock signal, and memory controller 22 sends data to memory devices 13 synchronous with another clock signal. Because the lines in channel 26 are impedance matched, the clock and data signals remain synchronized as they are transferred from device to device. Data transfers may be transferred effectively on both edges of the memory system clock.

On channel 26, control information, address information, and data move in packets. Each packet is transferred via channel 26 during a defined period of time. In one presently preferred embodiment, the period of time is four clock cycles, but any number of clock cycles might be conveniently used. Control/address information may be multiplexed with data on a single bus structure, however as presently preferred, an independent control/address bus is used, and data is transferred via a separate data bus.

There are at least two types of command packets: ROW and COL. These command packets have a predetermined structure or format, and include a number of bit fields. Some of these bit fields may be user definable. Some of these bit fields may have fixed definitions, while the definition of others changes depending on the value(s) of other bit fields.

ROW packets communicate an instruction from the memory controller 22 to memory devices 13 related to memory device row operations. Assuming as an example that memory devices 13 are DRAMs, the ROW packet command is used to activate a memory device, or to precharge rows in a memory device. The activate command acts like the falling edge of RAS in a conventional DRAM, and the precharge command acts like the rising edge of RAS. An activate command can be sent to any DRAM bank whose sense-amplifiers have been precharged. Other ROW packet commands include, for example, refresh, power state control, etc. As presently preferred, a ROW packet contains up to 24 bits of control information sent during a time period of four clock cycle over three lines of the control/address bus.

Column (COL) packets are also sent via the control/address bus. COL packets carry column instructions, like read and write instructions from the memory controller to a memory device. As presently preferred, a COL packet contains up to 40 bits of control information sent during a time period of four clock cycle over five lines of the control/address bus. The preferred COL packet is split into at least two fields. The first field specifies the primary operation, such as a Read or Write to be performed by an activated memory device(s). The second field may be used for masks or extended operation (XOP) commands like an explicit Precharge.

A data packet is sent from the memory controller to a memory device during a Write operation. In a Read operation, a data packet is "returned" to the memory controller from a memory device. The term "returned" is used in reference to the fact that all Read operations begin for a memory device with a Read command issued from the memory controller, and to avoid potential confusion by use of a generic term such as "transmit" or "sent" which might also apply to a Write data packet from the memory controller.

As presently preferred, a data packet contains 16 bytes of data returned to the memory controller during a Read operation over dual 8-bit data buses, DQA and DQB, during the four clock cycle data transfer period. One byte of data per data bus is read on each rising and falling edge of the clock. During a Write operation, data packets may be masked to allow as little as a single byte to be written in a memory device.

Both ROW and COL packets include a device identification (ID) field. As typically configured, the ROW device ID field and the COL device ID designate a single memory device for each Read or Write operation. Thus, the assignee's memory system allows a specific memory device to respond to a read/write command in accordance with the device ID fields specified in the ROW and COL packets. Relative to the conventional structure shown in FIG. 2, this ability provides remarkable advantages. For example, no separate control signal path need be established between each memory device and the memory controller. Rather, the channel communicates all information be it data, control, or address.

Applications have recently been identified in which memory system operations would be enhanced by the response of more than one memory device to a single set or combination of command packets. More particularly, the device ID fields of the ROW and COL packets have been identified as one vehicle by which a plurality of memory devices may be enabled in the context of a single read/write operation. Further, the use or interpretation of the device ID fields of the ROW and COL packets may vary according to the operating mode of the memory system.

U.S. patent application Ser. No. 09/395,160 filed Sep. 14, 1999, issued as U.S. Pat. No. 6,370,668 on Apr. 9, 2002, discloses these features in the specific context of chip-kill verses non-chip-kill modes of operation. The disclosure of this commonly assigned application is incorporated herein by reference. The referenced application describes, in one aspect, an invention which uses one or more device IDs contained in ROW or COL packets to activate a plurality of memory devices in a memory system in order to Read/Write data from/to a plurality of memory devices while the memory system is operating in chip-kill mode. In contrast, the same one or more device IDs are interpreted to activate a single memory device in non-chip-kill mode.

Like the chip-kill and non-chip-kill modes of operation described in the foregoing application, memory system designers would benefit by a generic ability to transfer data to and from a plurality of memory devices connected to a memory controller via a common channel in response to a common command. The common command would preferably have the same (or very similar) form or structure no matter the memory system mode of operation. The common form or structure would be interpreted differently as between the different modes of operation.

For example, taking a convenient example, a device ID field contained in a ROW or COL packet would be interpreted in a first mode of memory system operation to activate and/or act upon a single memory device. The single memory device might upon receiving the device ID field Read or Write data, perform some other memory device function such as precharge, or transition between operational states, such as power states. In contrast, during a second mode of operation, the same device ID field would be interpreted to activate and/or act upon multiple memory devices. Like the single memory device in the first mode of operation, the multiple memory devices might Read/Write data, precharge, refresh, transition power state, indicate operational status to the memory controller, or perform any number of other functions. So long as the memory devices recognize the current mode of memory system operation, and receive the device ID field(s), they are able to respond as a single group of memory devices, or as a subset of selected memory devices.

One of ordinary skill will recognize that the device ID fields used throughout are merely examples. Any reasonable portion of a control packet and/or an address packet might be interpreted differently, as between modes of operation. In one aspect of the invention, however, the form, structure and timing of the control/address packet need not significantly change between the two or more modes of operation. That is, a common command packet structure may be provided for all modes of operation, and portions of the common structure be interpreted differently between the modes of operation.

For example, many power state transitions within a memory system are efficiently made by grouping memory devices. The size of the grouping may vary by mode of operation or particular design requirements. Thus, in one mode of memory system operation, power transitions may be made on a single memory device-by-single memory device basis. In another mode of operation, however, power transitions might be best made on a group of memory devices-by-group of memory devices basis.

In another example, a plurality of relatively lower bandwidth memory devices responds to a single Read/Write command. By having a group of the lower bandwidth memory devices respond, the memory system may transfer a first block of data during a first time period, where individually each memory device, responding singularly, could not transfer sufficient data to form the first data block in the first time period. In other words, during the first time period, each memory device might be limited to a maximum data transfer rate equal to a second data block, smaller than the first data block. Only by accessing a group of such memory devices and combining their respective outputs can the memory system provide the required data throughput.

The group of memory devices can be accessed by a common set of commands using, for example, the device ID fields. The data transferred from the group of memory devices may be combined using cycle multiplexing, bit multiplexing, or a combination of cycle/bit multiplexing. In cycle multiplexing, each memory device in the group of responding memory devices will communicate data during a selected portion (a second time period) of the first time period. In bit multiplexing, each memory device in the group of responding memory devices will seize a selected portion (a number of "dedicated" bit lines) of the data bus during the first time period. The commonly assigned application incorporated by referenced above includes specific detailed examples of cycle multiplexing, bit multiplexing, and time/space multiplexing.

In one embodiment of the present invention, a single memory device in a memory system operating in a first mode transitions from a higher power state (such as Active or Standby) into a lower power state (such as Nap or Powerdown) according to a "power transition command" contained in a command packet. In contrast, when the memory system is operating in a second mode, a power transition command will cause a similar transition in a group of memory devices receiving the common command packet.

Any number of memory system design and use considerations may drive the definition of multiple memory system operating modes. Expected cyclical variations in data access, initiation of particular applications, and user volume are ready examples of such considerations.

As will be seen hereafter, memory devices may be grouped, physically and/or logically, in any reasonable configuration. Within such configurations, it may be desirable in some operating modes to transition memory devices on a group basis using a single command or single set of commands, e.g., a set of ROW and COL command packets. The present invention enables this capability while preserving the common structure of the command packets.

In the example used throughout the commonly assigned application incorporated above, the same number of devices respond to ROW packets as respond to COL packets. However, it is possible to have a different number of devices respond to ROW packets that COL packets. This ability can be very useful for memory systems which map consecutive column addresses to different memory device groups. For example, when consecutive Read operations to adjacent column addresses map to different memory device groups, each group will require an Activate operation before the Read operation is performed. In systems in which the number of Column operations per Active operation is fixed and larger than one, Row command bandwidth can be reduced by having multiple memory device groups respond to each Activate (Row) packet. For example, if it is known that two Column operations are performed for each Activate (Row) operation, and if it is the case that these two Column operations span two memory device groups, then Row command bandwidth can be saved by having both memory device groups respond to the same Activate packet. This saves Row command bandwidth so that it can be used for other purposes or operations.

With all of the foregoing in mind, memory systems can be designed in a vast number of specific configurations, all including a plurality of memory devices capable of operating in multiple modes. Several exemplary configurations are shown in FIGS. 5 through 12. These configurations do not come close to exhausting the design possibilities, but do further explain how groups of memory devices might be effectively used in a memory system capable of operating in multiple modes.

Further, the exemplary configurations may be used to construct memory systems comprising "low bandwidth" memory devices logically arranged in groups, such that one or more groups may be accessed to provide relatively higher data throughput.

Figure 5:
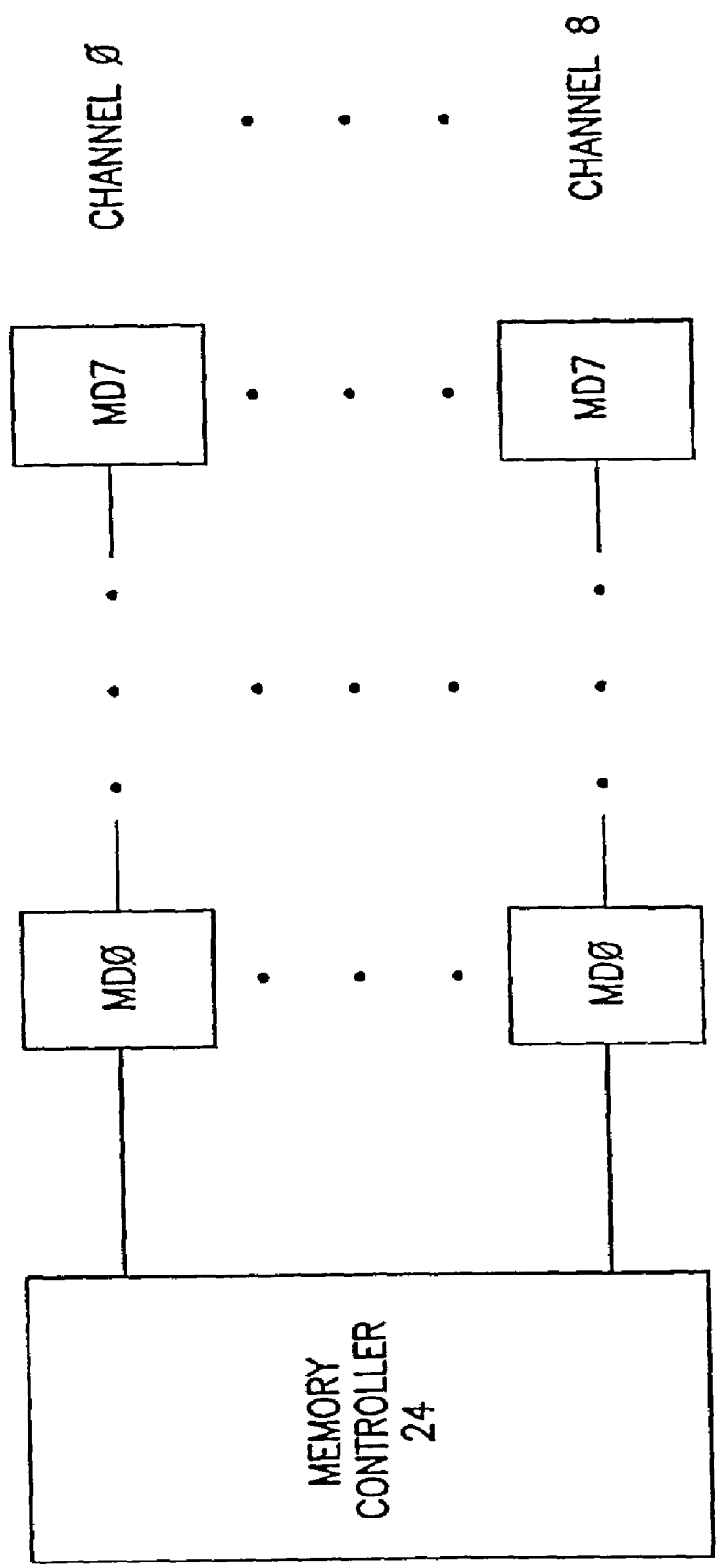
FIGS. 5–12 illustrate various exemplary memory system configurations within the context of the present invention.
Figure 6:
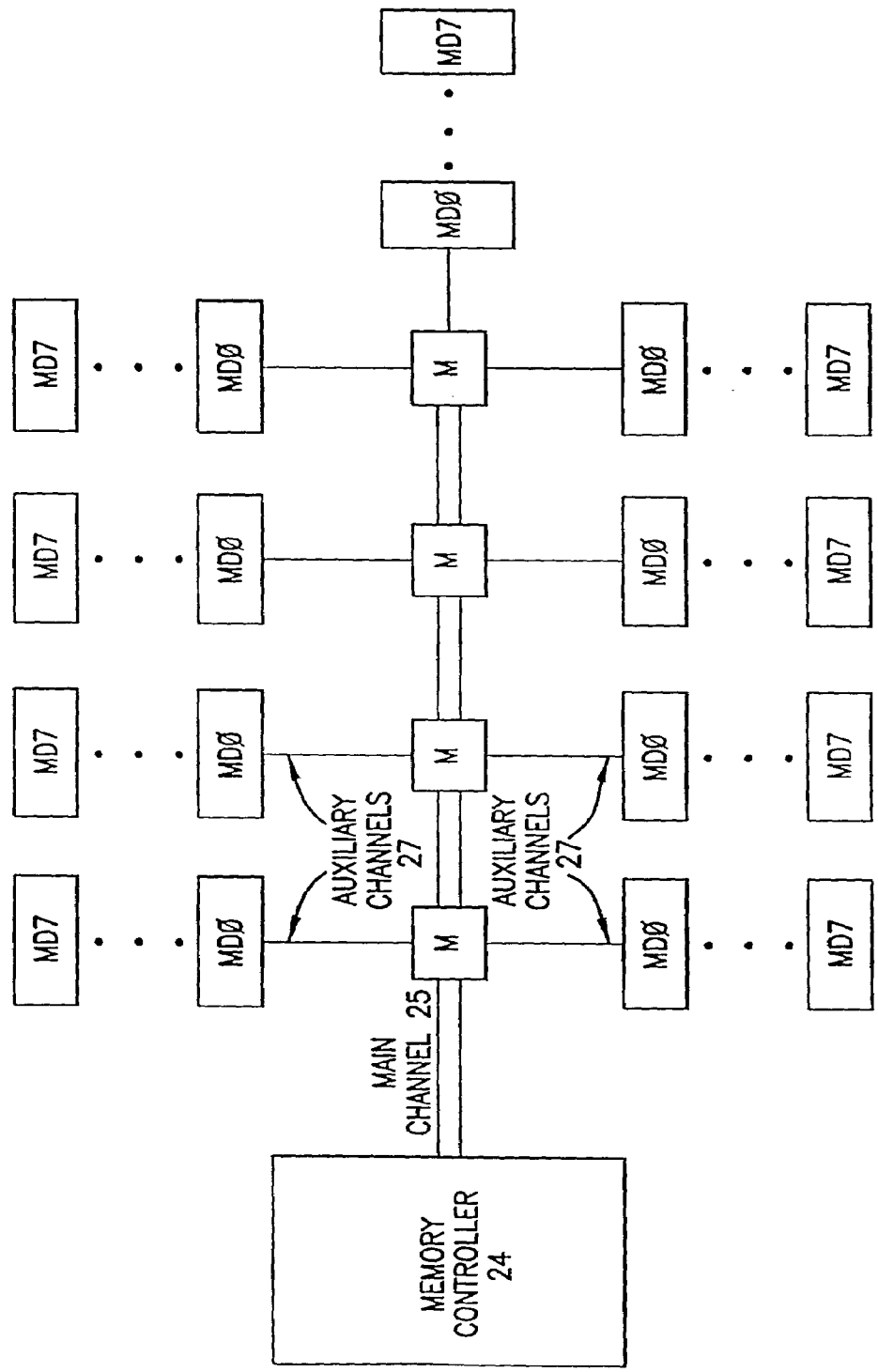

FIGS. 5 and 6 show possible memory system configurations comprising 9 channels, each channel including eight memory devices, and each memory device contributing 2 bytes of data per Read/Write operation.

In the memory system shown in FIG. 5, each one of the 9 channels send/receives 16 bytes of data per Read/Write operation, for a maximum of 144 bytes of data across the 9 channels. The 144 bytes of data may include 128 bytes of actual data and 16 bytes of syndrome, or any other desirable combination of 144 bytes of data. Memory controller 22 sends the same command to each one of the 9 channels, and a group of eight memory devices, MD0–MD7, responds for each channel.

In the memory system of FIG. 6, memory controller 24 sends one or more commands down a main channel 25 connecting a plurality of data replication repeaters "M" (hereafter "the repeater"). One of ordinary skill in the art will understand that any acceptable implementation of the repeater can be used to effect the benefits of the present invention. Functionally, the repeater receives channel information, replicates the information, and directs the information to one or more other channels.

Main channel 25 may vary is size, for example from 2 bytes wide to 18 bytes wide. In operation, the first repeater on main channel 25 creates a copy of the memory controller command, sends it to the next repeater on main channel 25, and also sends the command to at least one auxiliary channel 27. Each auxiliary channel 27 communicates with eight memory devices, MD0–MD7, each of which contributes 2 bytes to per Read/Write operation, such that each auxiliary channel transfers 16 bytes of data per Read/Write operation. Assuming 9 auxiliary channels, as shown in FIG. 6, up to 144 data bytes may be transferred by the memory system for each Read/Write operation issued by the memory controller over a plurality of clock cycles, as determined by the width of main channel 25.

Other memory system configurations might use four and half channels, each full channel including sixteen memory devices, the half channel including eight memory devices. In these configurations, each memory device contributes 1 byte of data per Read/Write operation.

Figure 7:
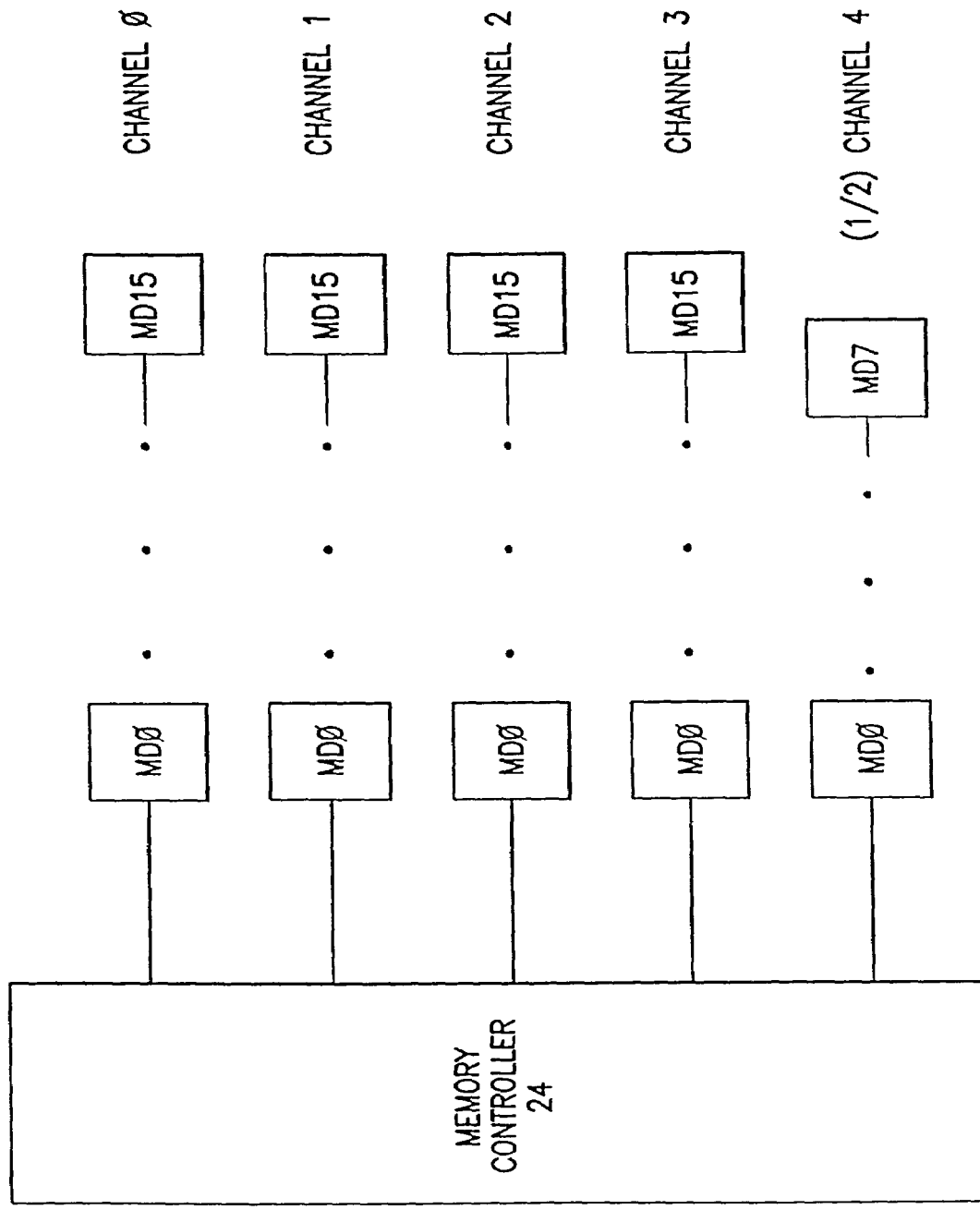

Thus, in FIG. 7 channels 0 through 3 include sixteen memory devices, MD0–MD15 and channel 4 includes eight memory devices, MD0–MD7. With this configuration and assuming each memory device transfers 1 byte of data per operation, each Read/Write operation transfers up to 72 bytes of data. The 72 bytes of data may include 64 bytes of actual data and 8 bytes of syndrome, or any other desirable combination of 72 bytes of data.

Figure 8:
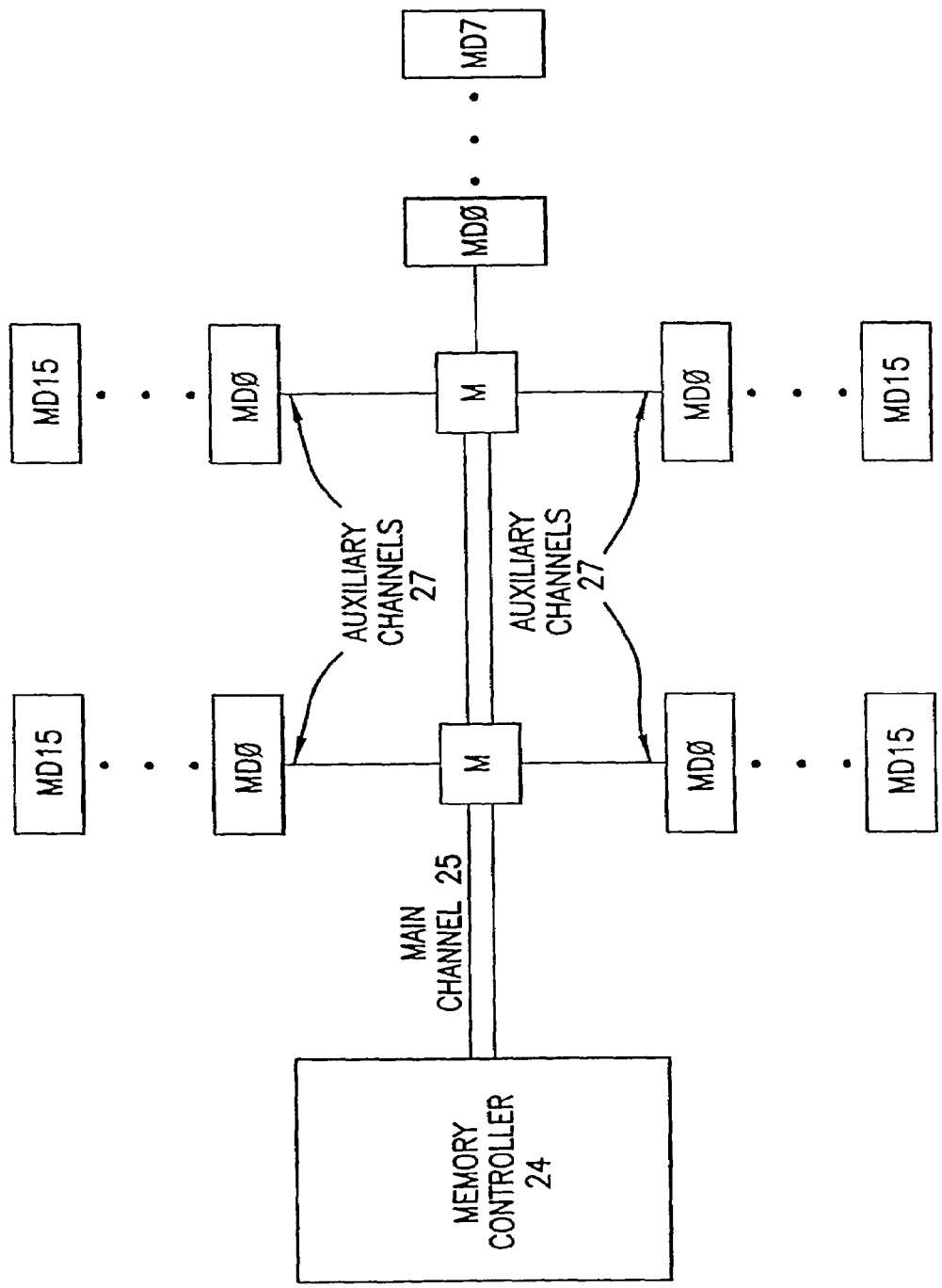

Like the memory system of FIG. 6, the memory system of FIG. 8 sends commands down a main channel 25 connecting a plurality of data replication repeaters M. Here, two repeaters control the four and a half channels described above via five auxiliary channels 27.

The system configurations shown in FIGS. 5–12 are particularly well suited for implementation with X8 or X16 memory devices. Alternatively, the system configurations might incorporate X9 or X18 memory devices. The present invention may be implemented for any reasonable system definition of bits/bytes per memory device, bits per byte, bytes per channel, and first and second data block sizes. However, since X16 and X18 memory devices are widely available and well known to memory system designers, the memory system configuration examples herein are given assuming such memory devices.

Figure 9:
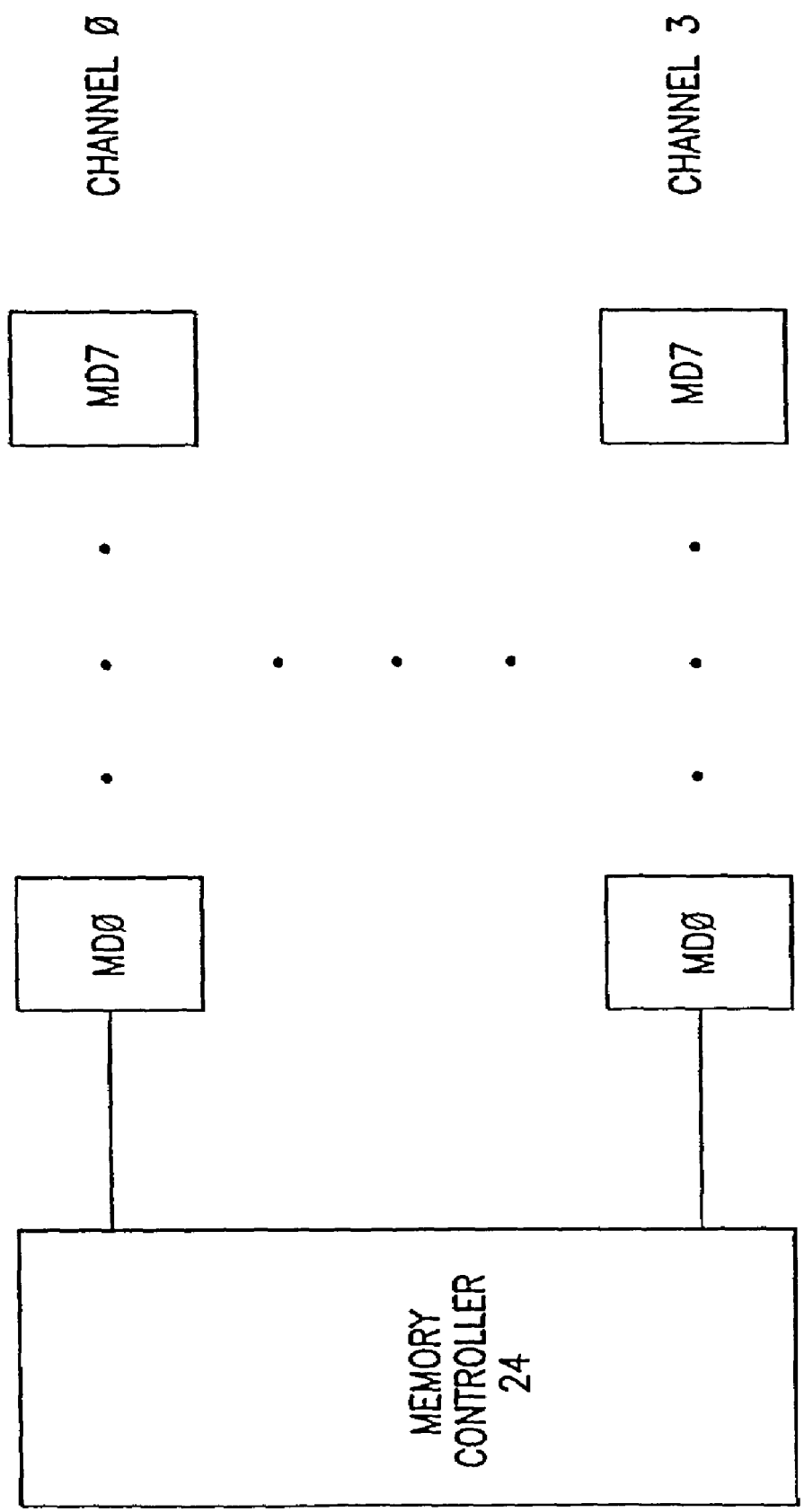
Figure 10:
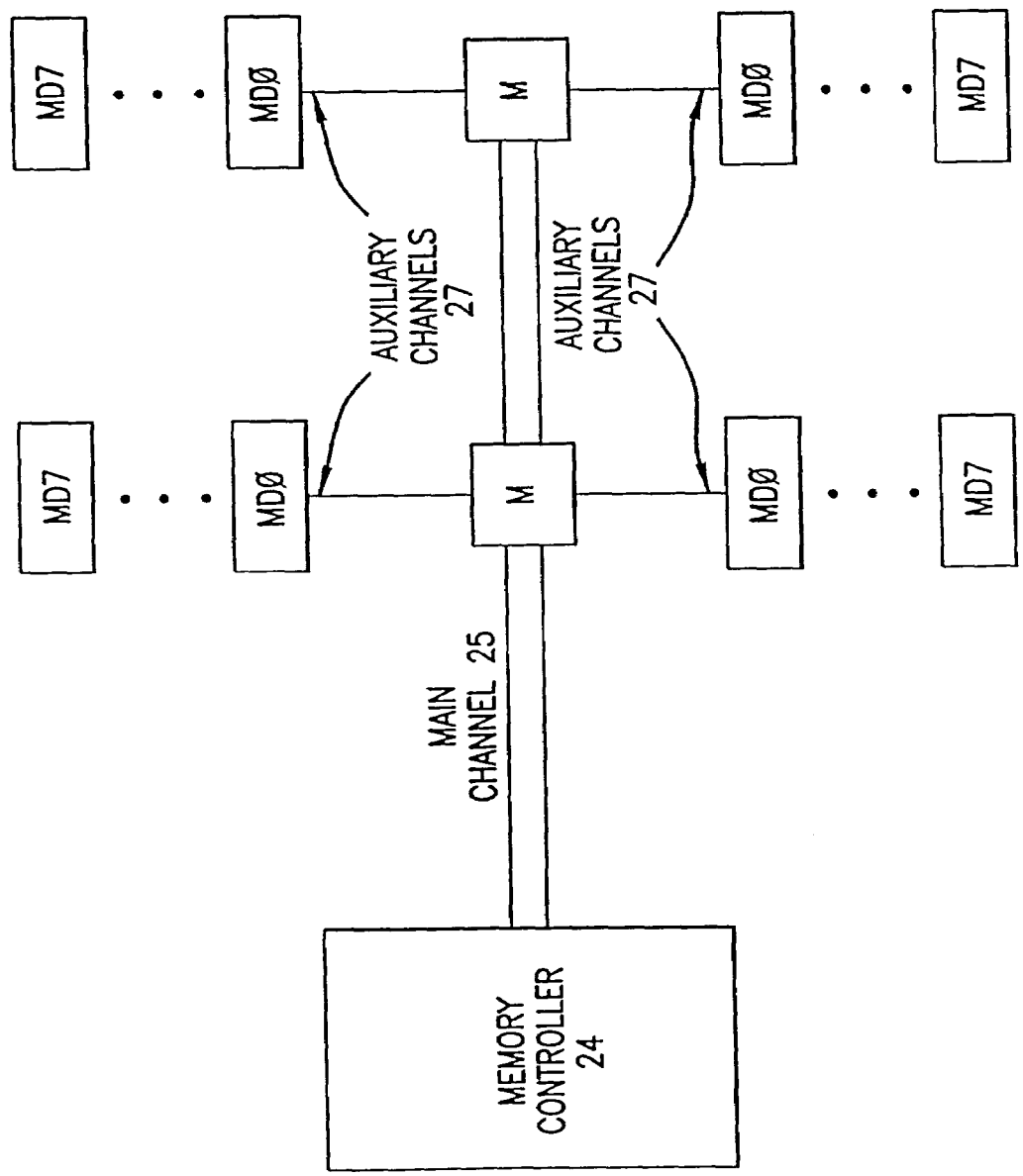
Figure 11:
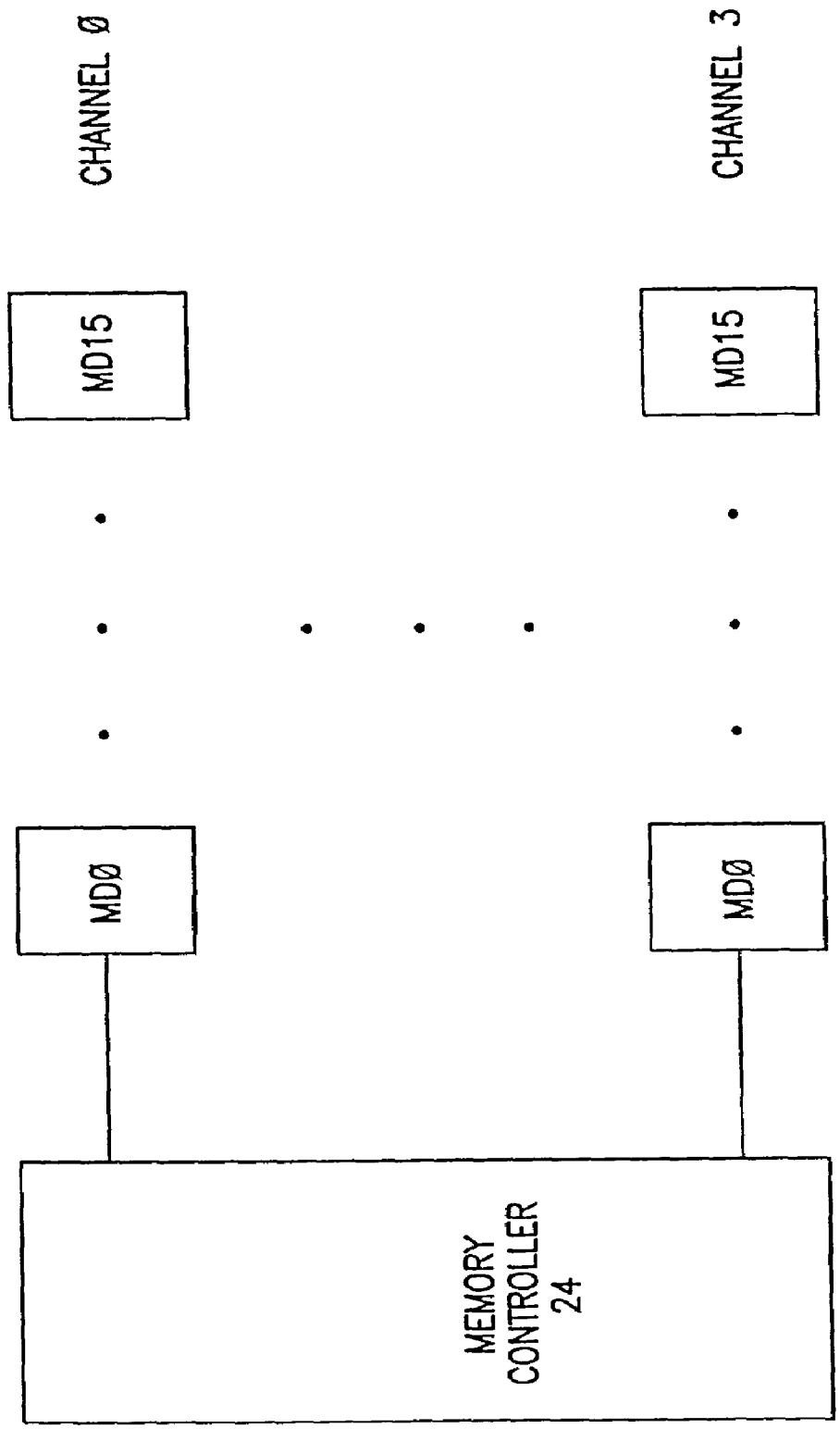
Figure 12:
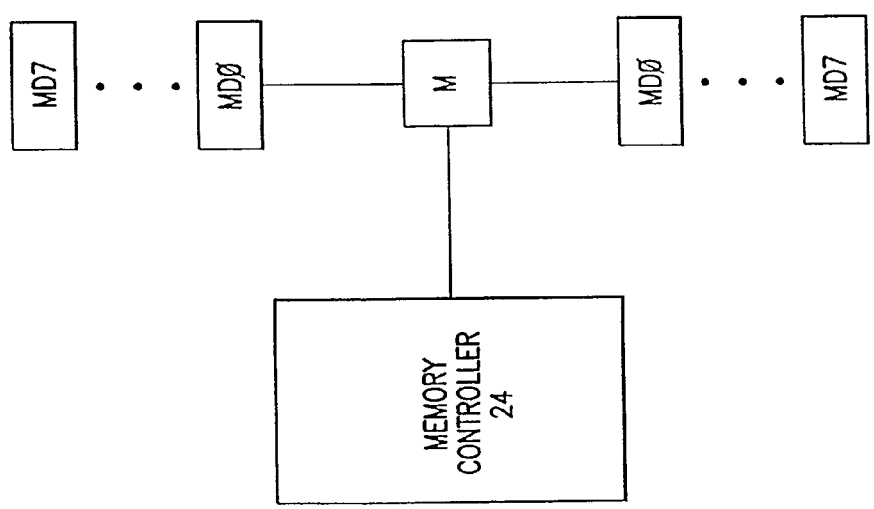

Thus, assuming each memory device contributes two bytes of data per operation, 4 channels of X18 memory device, MD0–MD7, may be connected to memory controller 24, as shown in FIGS. 9 and 10. In each of these memory system configurations, each channel transfers up to 16 (9-bit) bytes of data per operation for a maximum total of 64 (9-bit) bytes of data. Since each byte is 9-bits long, the 64 total data bytes per operation may include 64 (8-bit) bytes of actual data and 8 (8-bit) bytes of syndrome, or any other desirable combination of data/syndrome. Similarly, the memory system configurations shown in FIGS. 11 and 12 reduce the number of channels to two, but uses sixteen memory devices per channel to accomplish the same data transfer rate.

The foregoing examples are much more than simple design choices. Each example illustrates how a plurality of memory devices responding as a group to a single Read/Write operation can transfer high bandwidth data. In some memory system modes of operation, this high bandwidth data includes syndrome for error detection and correction.

The chip-kill mode/non-chip-kill mode of the above incorporated application is an excellent specific example of this more generally applicable capability. That is, despite an assumption that each memory device in a group of responding memory devices is individually incapable of transferring high bandwidth data, (i.e., assuming each memory device in the group is incapable of transferring a full channel of data during a defined data transfer period), any one of the foregoing memory system configurations might be used to effectively implement a memory system having a chip-kill mode of operation. Since by its nature chip-kill mode spreads a first data block across two or more memory devices, the 8 and 16 memory device groupings shown in FIGS. 5–12 readily lend themselves to the implementation of a memory system having a chip-kill mode of operation.

More importantly, the foregoing memory system configurations, and many similar memory system configurations consistent with the present invention, allow cost effective use of relatively low bandwidth memory devices. As discussed earlier, high data throughput is a major goal of nearly every contemporary memory system design. High data throughput for a memory system is a function of memory device bandwidth, i.e., how much data can be transferred from a memory device during a single operation. As a rule, however, high bandwidth memory devices are significantly more expensive and often consume much more power than low bandwidth memory devices.

Memory system configurations provided by the present invention, as illustrated by the examples in FIGS. 5–12, operationally group 8 (or 16) memory devices together. When operated in a group, each memory device provides only ⅛th or ¹⁄₁₆th of the total maximum data bandwidth using, for example, cycle multiplexing or bit multiplexing. Thus, using a specific example, it is possible to have 8 memory devices with memory cores that operate at a maximum of 200 MB/sec connected to the same channel so that the aggregate data bandwidth across the 8 memory devices is 1.6 GB/sec. Obviously, the specific operating characteristics will vary according to the design of the memory device, and memory devices may be grouped in any convenient number, but the present invention allows relatively low data bandwidth memory devices to operate as a group in order to provide high data bandwidth during a defined data transfer period. This ability provides several advantages including reduced die size for individual memory devices. Memory devices with reduced die size are less costly, and consume less power.

Alternatively, memory devices supporting multiple operating speeds, or multiple modes of operation having different operating speeds, may be grouped according to the present invention and operated at a lower speed/mode. Such operation results in a lower effective data bandwidth per memory device, but the grouping of such memory devices more than compensates for the lower individual memory device bandwidth. In other words, high channel bandwidth may be achieved with memory devices operating well below their maximum speed, or in a lower operating mode. Lower memory device operating speeds and operating modes reduces power consumption, and may extend the useful life of the memory devices.

The present invention has been described in relation to several embodiments and exemplary configurations. Such are given by way of example, not restriction to the present invention which is defined by the attached claims. Operating characteristics for several contemporary memory devices have been assumed in these examples, e.g., 8-bit, X16 and 9=bit, X18 devices, etc. Such memory device specific assumptions do not limit the attached claims, absent express corresponding limitations. Similarly, operating speeds, clock speeds, data transfer periods, and data transfer schemes are given above as examples. The present invention contemplates the use of any convenient clocking arrangement, timing parameters, and data/control information transfer periods and schemes.

One of ordinary skill will recognize the difference between low bandwidth memory devices and high bandwidth memory devices. The specific example above wherein a low bandwidth memory device operates in a range of 200 MB/sec and a high bandwidth memory device operates in a range of 1.6 GB/sec is illustrative, but does not strictly limit the terms "low bandwidth" and "high bandwidth" as used in the claims. Obviously, the operating speed of memory devices will change over time and by design. However, it will remain apparent to one of ordinary skill that some memory devices are by their nature and operating characteristics capable of transferring relatively lower data bandwidth during a defined data transfer period than other memory devices capable of transferring relatively higher data bandwidth in the same data transfer period.

As described above, the lines forming channel 26 of FIG. 4 are preferably terminated at their characteristic impedance at one end and at memory controller 22 at other end. The terminators pull bus line signals up to a memory system supply voltage $V_{term}$ which corresponds to logic "0" in the memory system. A memory device or memory controller 22 asserts a logic "1" by sinking current from a line, preferably using an open-drain NMOS transistor structure. Thus, power is principally dissipated on channel 26 only when a device drives a logic 1 on a line. The data bus can thus be thought of as implementing a wired "OR" function.

This particular aspect of the present invention readily facilitates data bus multiplexing between multiple memory devices. Taking bit line multiplexing as an example and assuming a Read operation, all masked data bus lines at $V_{term}$ are interpreted as providing a "0" data value, and all unmasked data bus lines at ground are interpreted as providing a "1" data value. This is true regardless of the specific memory device responsible for the voltage apparent on each data bus line.

To further illustrate this point, consider the example in FIG. 13 which shows part of a memory system. In the illustrated partial memory system, a plurality of memory devices (MD0, MD1, MD2, . . . ) combine during a data transfer period using bit line multiplexing to return a data packet to memory controller 24 via an 9-bit data bus DQA. Each memory device contains nine data I/O pins respectively connected to one of the nine data bus lines (0 . . . 8) of DQA. However, because bit line multiplexing is used, each memory device is capable of effectively driving data onto less than all nine data bus lines during the data transfer period.

The "wired OR" nature of the data bus contemplated in this particular aspect of the present invention readily facilitates bit-line multiplexing by a number of memory devices. In the illustrated example, it is assumed that MD0 will drive "valid" data onto bits lines 7 and 8 during a particular cycle. Similarly, MD1 drives valid data onto bit lines 1 and 2, MD2 drives bit line 2 and 3, etc. The "valid" distinction is made above because each memory device actually drives all nine data bus lines during every cycle. However, use of a current-mode I/O driver between each memory device and the data bus lines allow logical "0's" to be output for all data bus lines not validly driven by a particular memory device during the cycle. In effect, all "0-driving" I/O drivers do not electrically connect to the wired OR data bus. Thus, MD0 will output 0's on data bus lines 0 through 6, MD1 will output 0's on data bus lines 2 through 8, etc.

As a result of the foregoing, only one memory device per cycle is actually able to drive a logical 1 onto any one data bus line. All other memory devices during the cycle are unable to effect the signal voltage level of the data bus line.

In this manner, the wired OR nature of the data bus and the particular current-mode I/O driver contemplated by this aspect of the present invention allow effective multiplexing.

The same result occurs for memory devices using time-multiplexing or time/space-multiplexing of the data bus. During defined data transfer periods, the memory controller "sees" data on the bus from one or more memory devices which seize data bus lines on a time basis, a bit line basis, or a time/bit line basis as prescribed by memory controller generated command packet(s). Using the wired "OR" nature of the data bus, any one of these multiplexing techniques allows a group of memory devices to generate a single data packet in response to a single command packet or single set of command packets.

Further Description of ROW and COL Packets

In part, an exemplary ROW packet structure is illustrated in FIG. 14A. In non-chip-kill mode, the ROW Packet addresses a memory device using a (first) device identification (ID) field. The ROW packet device ID field comprises a number of bits, for example bits 1–5 in FIG. 14A, communicated on the rising and falling edges of a first clock cycle, cycle 0, over three lines of the control/address bus, designated as ROW[3] through ROW [0]. The device ID field may include an additional bit used in certain "broadcast" functions in which all memory devices respond to a ROW packet. However, for the sake of simplicity the exemplary ROW packet device ID field discussed hereafter is assumed to have 5 bits.

These bits, ranging from most significant bit 1 to least significant bit 5, in combination with an activation bit, form a device activation code that identifies one or more memory devices. In effect, the device activation code is interpreted in a memory device ID register to select a corresponding memory device. That is, in non-chip-kill mode, each bit in the ROW packet device ID field must properly match a corresponding value in a specific memory device ID register in order to activate the memory device. In the activate command, the bank and row of the "activated memory device" specified in the packet command transitions from precharged to active, thus becoming ready for a subsequent operation identified by a COL packet.

Column (COL) packets are also sent across the control/address bus. COL packets carry column instructions, like read and write instructions from the memory controller to a memory device. In part, an exemplary COL packet structure is illustrated in FIG. 14B. Preferably, the COL packet contains up to 40 bits of control information sent during a time period of four clock cycle over five lines of the control/address bus. The preferred COL packet is split into at least two fields. The first field specifies the primary operation, such as a Read or Write, to be performed by an activated memory device(s). This first field is shown, as an example, by bits COP bit 1 and COP bit 2 in FIG. 14B. The second field (not shown in FIG. 14B) can be used for masks, such as for Writes, or can be an extended operation (XOP) command, like an explicit Precharge.

The COL packet also includes a (second) device ID field, including a number of bits ranging from a most significant bit 1 to a least significant bit 5. These bits form the device ID code, shown for example in FIG. 14B as bits 1–5, communicated on the rising edge of the first clock cycle, cycle 0, over five lines of the control/address bus, designated as COL[4] through COL[0]. The memory controller performs the operation specified by COP bit 1 and COP bit 2 on the memory devices identified by the COL packet device ID field.

Examples of Single Memory Device Operations and Multiple Memory Device (Cycle Multiplexing) Operations In non-chip-kill mode, a data packet is sent from the memory controller to a memory device during a Write operation. In a Read operation, a data packet is returned to the memory controller from a memory device. The term "returned" is used in reference to the fact that all Read operations begin with a Read command issued from the memory controller, and to avoid potential confusion by use of a generic term such as "transmit" or "sent" which might also apply to a Write data packet from the memory controller.

Preferably, the data packet contains 16 bytes of data, returned to the memory controller during a Read operation over dual 8-bit data buses, DQA and DQB during four clock cycles. See FIG. 15. One byte of data per data bus is read on each rising and falling edge of the clock. During a Write operation, data packets may be masked to allow as little as a single byte to be written.

Chip-kill mode may be indicated in a memory system according to the present invention in a number of ways. For example, a single "chip-kill enable" bit in an initialization register may be set during manufacture of the memory system. Alternatively, the chip-kill enable bit might be set by a requestor upon system initialization. However set, the chip-kill enable bit defines for the memory system whether it operates in non-chip-kill mode or in chip-kill mode.

As noted above with respect to conventional memory systems, in chip-kill systems data to be read from and written to the memory system is spread across multiple memory devices so that an ECC generator can be used together with an error detection and correction algorithm to detect and correct data errors. In the present invention, this general concept is followed. That is, data is read from and written to a plurality of memory devices through an ECC generator resident in the memory controller.

Returning to the exemplary structure in FIG. 3, an ECC generator of conventional design may be readily incorporated into memory controller 22. The actual specification and integration of an ECC generator into memory controller 22 is a matter of design choice and exercise of ordinary skill in the art. Since the structure and function of the ECC generator will vary with the nature of the error detection and correction algorithm in use, and with the overall memory system definition, no attempt is made to illustrate a particular ECC generator. Rather, as with the conventional system, the ECC generator in the present invention will generate the necessary syndrome and add the syndrome to data packets being written into memory, and will separate and utilize syndrome stored in memory to detect and correct errors in the data being read from memory.

Data packets may be "spread over" a number of memory devices in the present invention using any one of several methods. Cycle multiplexing, bit multiplexing, or both may be used to time multiplex, space multiplex, time and space multiplex the data across a number of memory devices.

Figure 15:
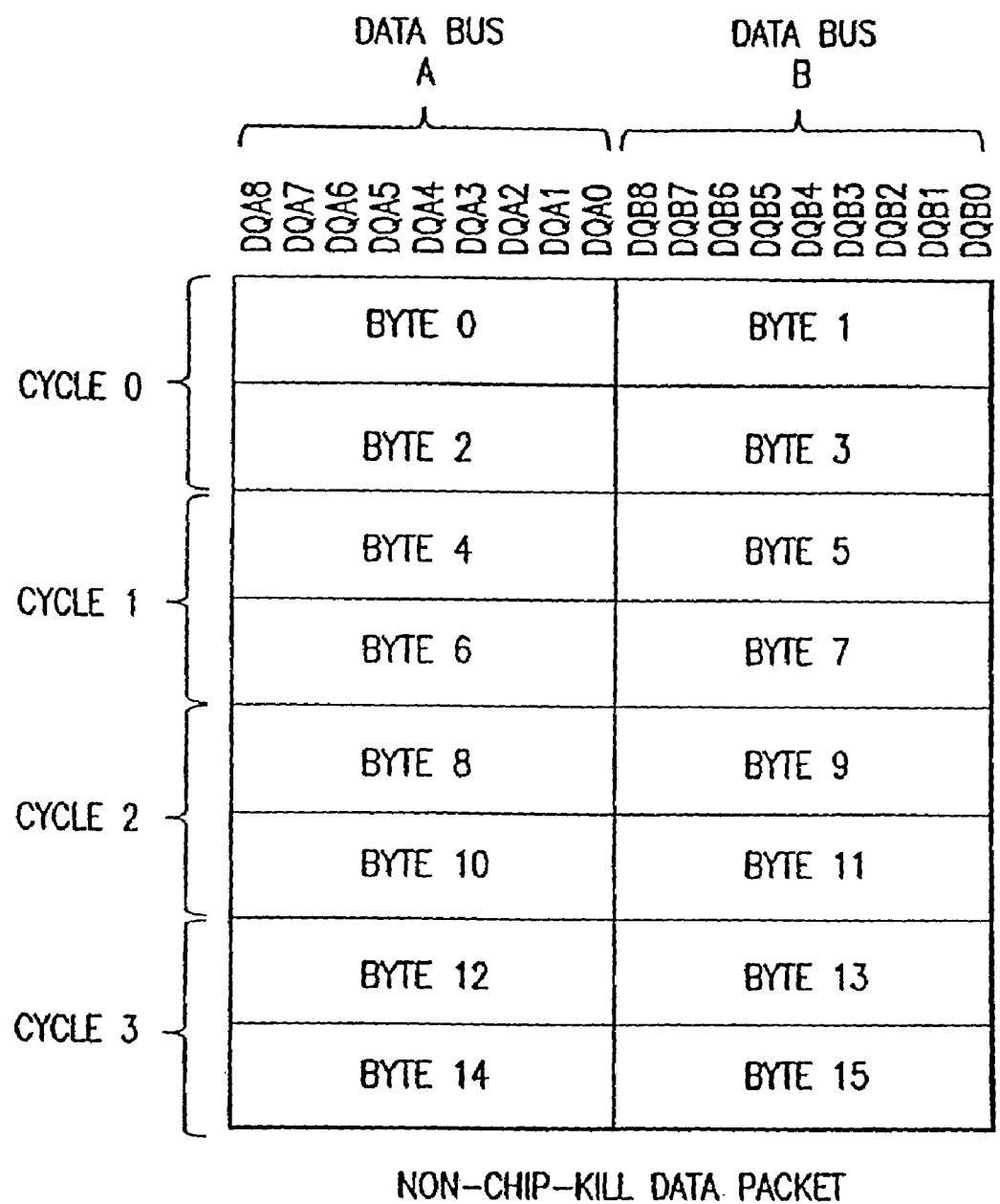
FIG. 15 illustrates an exemplary data packet returned in non-chip-kill mode.
Figure 16:
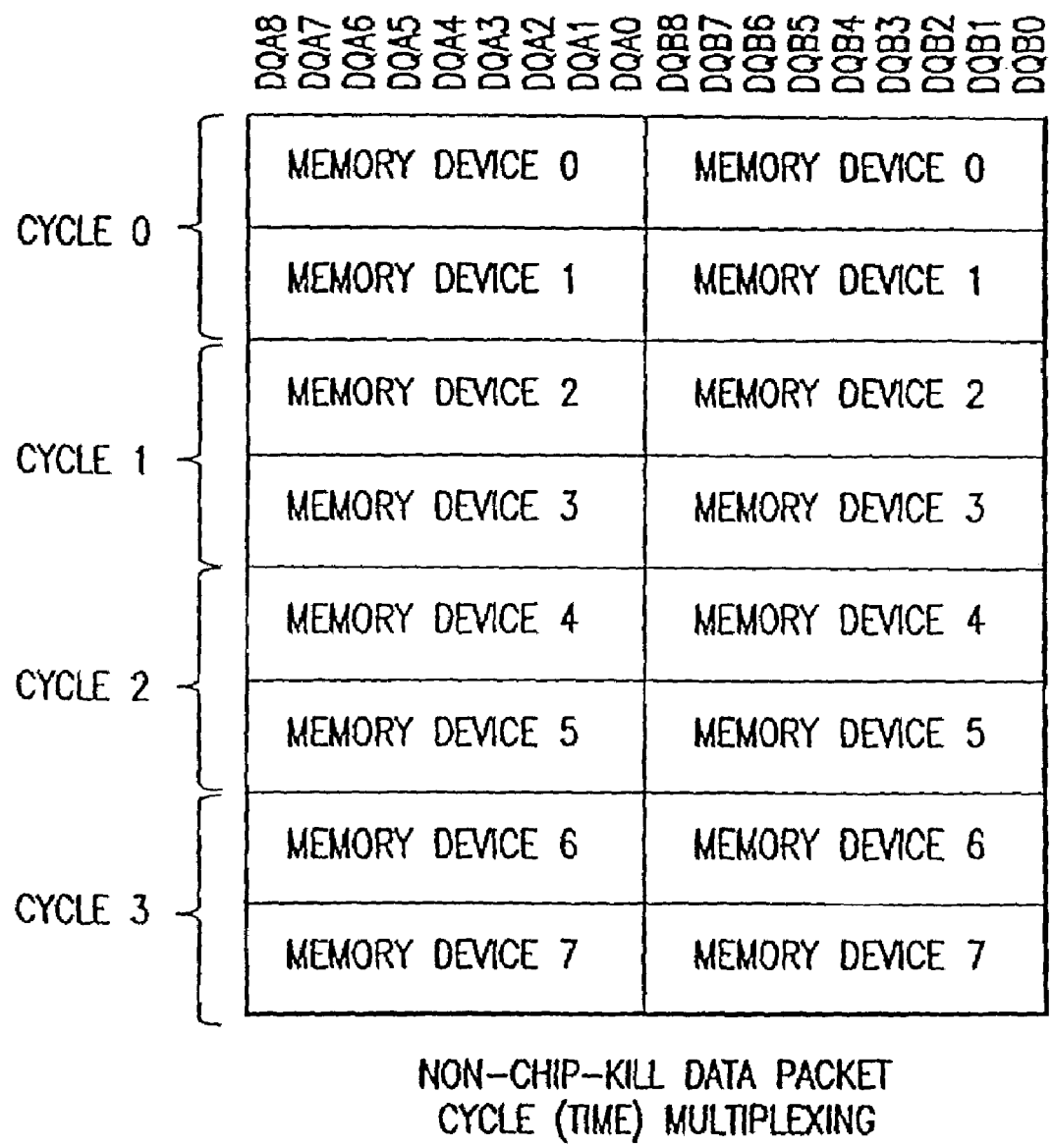
FIG. 16 illustrates an exemplary data packet returned in chip-kill mode using cycle (or time) multiplexing.

Cycle multiplexing of a data packet in the present invention is illustrated in FIG. 16, and by a comparison of FIG. 16 to the data packet shown in FIG. 15. Again, a 16 byte, 9-bit per byte, data packet read from memory via two 9-bit data buses, DQA and DQB, over four clock cycles is assumed as an example. However, when the memory system according to the present invention is operated in chip-kill mode, rather than activating one memory device and reading 16 data bytes (a first data block) from the activated memory device during the four clock cycles (a first time period) as it does in non-chip-kill mode, a plurality of memory devices are activated, as described below, and 2 data bytes (a second data block) are read in sequence from each one of eight memory devices during each half clock cycle (a second time period), i.e., on either a rising or a falling clock edge.

Thus, in the example illustrated in FIG. 16, and assuming a read operation, memory device 0 returns two 9-bit bytes of data on the rising edge of clock cycle 0. One byte of data is returned via data bus DQA and the other byte of data is returned on data bus DQB. In sequence, memory device 1 follows on the falling edge of clock cycle 0, and so on, down to memory device 7 which returns two bytes of data on the falling edge of clock cycle 3. One of ordinary skill in the art will readily understand from this description that sixteen memory devices might be used to provide one byte of data on either DQA or DQB per half clock cycle. Similarly, a single 16-bit data bus might receive 16-bit data quantities from eight memory devices. Such division and definition of data packets and data buses, along with packet transfer timing and clock cycle definition is a matter of design preference, and will take into account the capabilities and specifications of the memory devices used in the memory system. The aforementioned implementations also work for 8-bit bytes.

When the memory system is operating in chip-kill mode, syndrome for a first data block can be distributed among the second data blocks read from each one of the plurality of memory devices. The exact form of such syndrome distribution is left to the memory system designer. Syndrome may be evenly spread across a group of second data blocks, or some second data blocks may be entirely made up of syndrome. During the four clock cycle period of time, a complete 16-byte data packet is returned to the memory controller. That is, the 16 bytes forming the data packet are returned two bytes per half clock cycle from each of eight memory device during this time period. The data packet returned to the memory controller in chip-kill mode has the same number of bytes as the data packet returned in non-chip-kill mode. Further, the data packet returned in chip-kill mode is transmitted over the same structure and using the same data packet transfer timing as those used in non-chip-kill mode. The additional timing mechanism required to sequentially read a series of second data blocks from the plurality of memory devices in order to form the first data block is discussed in commonly assigned U.S. Pat. No. 6,370,668, with reference to the ROW and COL command packets used in chip-kill mode.

During a Write operation, the transfer of data is essentially reversed. A data packet received from the requestor is evaluated by the ECC generator resident in the memory controller. Syndrome is generated and added to the data and stored in a plurality of memory devices during the same time period required to write a data packet in non-chip-kill mode.

In fact, cycle multiplexing in chip-kill mode is similar to the method used to mask write operations in non-chip-kill mode. In non-chip-kill mode, write masking is used to selectively write bytes of data into a memory device. Thus, the write masking hardware available in the memory system may be used for non-chip-kill and chip-kill operations. However, use of the common write mask hardware in chip-kill mode may well preclude the use of conventional Write Masks in chip-kill mode. Alternatively, additional masking hardware can be incorporated into the memory system and enabled only during chip-kill operation.

What is claimed is:

1. A memory system comprising:
   at least one channel;
   a plurality of memory devices coupled to at least the one channel; and
   a memory controller coupled to at least the one channel, wherein the memory controller provides a command to a first group of memory devices in the plurality of memory devices via at least the one channel, and the first group of memory devices, as a multiplexed group, communicate a first data block to the memory controller via at least the one channel during a first time period in accordance with the command; and
   wherein during the first time period each memory device in the first group of memory devices has a second transfer rate that is less than a first transfer rate for transferring the first data block during the first time period; and
   wherein each one of the memory devices in the first group of memory devices is configured to communicate in response to the command a respective second data block, which has a size less than the first data block size, during the first time period.

2. The memory system of claim 1, including two channels, each one of the two channels coupled to a second group of memory devices in the plurality of memory devices to the memory controller.

3. The memory system of claim 1, wherein a first memory device in the first group of memory devices is configured to transfer its respective second data block during a first portion of a first clock cycle of the first time period and a second memory device in the first group of memory devices is configured to transfer its respective second data block during a second portion of the first clock cycle of the first time period.

4. The memory system of claim 1, including four full channels and one half channel, each one of the full channels coupled to a first number of memory devices in the plurality of memory devices, and the one half channel coupled to half of the first number of memory devices.

5. The memory system of claim 4, wherein the first number of memory devices comprises sixteen memory devices.

6. The memory system of claim 1, including eight channels, each of the eight channels coupled to a respective second group of memory devices in the plurality of memory devices.

7. The memory system of claim 6, wherein the respective second group of memory devices comprises eight memory devices.

8. The memory system of claim 1, including four channels, each of the four channels coupled to a respective second group of memory devices in the plurality of memory devices.

9. The memory system of claim 8, wherein the respective second group of memory devices comprises eight memory devices.

10. A memory system comprising:
    a main channel;
    at least one repeater coupled to the main channel;

at least one auxiliary channel coupled to at least the one repeater;

a first plurality of memory devices coupled to at least the one auxiliary channel; and a memory controller coupled to the main channel, wherein during one mode of operation the memory controller provides a command to the first plurality of memory devices via the main channel, at least the one repeater and at least the one auxiliary channel, and the first plurality of memory devices, as a multiplexed group, communicate a first data block to the memory controller during a first time period in accordance with the command;

wherein during the first time period each memory device in the first of memory devices has a transfer rate that is less than a transfer rate for transferring the first data block during the first time period; and wherein each memory device in the first plurality of memory devices communicates in response to the command a respective second data block, which has a size less than the first data block size, during the first time period.

11. The memory system of claim 10, including a first auxiliary channel and a second auxiliary channel and a first repeater and a second repeater, and wherein the first repeater is coupled to the first plurality of memory devices via the first auxiliary channel, and the second repeater is coupled to a second plurality of memory devices via the second auxiliary channel.

12. The memory system of claim 11, wherein the the first repeater is coupled to the second repeater by the main channel.

13. The memory system of claim 10, wherein a first memory device in the first group of memory devices is configured to transfer its respective second data block during a first portion of a first clock cycle of the first time period and a second memory device in the first group of memory devices is configured to transfer its respective second data block during a second portion of the first clock cycle of the first time period.

* * * * *

UNITED STATES PATENT AND TRADEMARK OFFICE
CERTIFICATE OF CORRECTION

| | | |
|---|---|---|
| PATENT NO. | : 7,039,782 B2 | Page 1 of 1 |
| APPLICATION NO. | : 10/690402 | |
| DATED | : May 2, 2006 | |
| INVENTOR(S) | : Garrett, Jr. et al. | |

It is certified that error appears in the above-identified patent and that said Letters Patent is hereby corrected as shown below:

Column 17, line 15, between the words "first" and "of", please insert --group--.

Signed and Sealed this

Twenty-second Day of August, 2006

JON W. DUDAS
*Director of the United States Patent and Trademark Office*